United States Patent

Deschenes et al.

[15] 3,694,639

[45] Sept. 26, 1972

[54] PULSE CODE MODULATION DIGITAL COMPANDOR

[72] Inventors: Pierre A. Deschenes, 2560 rue Troyes, Sherbrooke, Quebec, Canada; Michel Villeret, 47 rue de la Libertian, Gisors, France

[22] Filed: April 7, 1970

[21] Appl. No.: 26,313

[52] U.S. Cl. ............................235/154, 340/347 DD

[51] Int. Cl. ................................................H04l 3/00

[58] Field of Search .........340/347; 235/154; 178/26; 179/18 TR, 15 AC, 15.55

[56] References Cited

UNITED STATES PATENTS

| | | | |
|---|---|---|---|
| 3,510,868 | 5/1970 | Chatelon | 340/347 |
| 2,856,597 | 10/1958 | De Motte | 340/347 |
| 2,907,019 | 9/1959 | Merlin, Jr. | 340/347 |
| 3,016,527 | 1/1962 | Gilbert et al. | 340/347 DD |
| 3,008,127 | 11/1961 | Bloch et al. | 340/347 DD X |

*Primary Examiner*—Maynard R. Wilbur
*Assistant Examiner*—Charles D. Miller
*Attorney*—Raymond A. Robic

[57] ABSTRACT

A device for compressing or expanding a number $x$ having plural binary digits and belonging to a predetermined range of numbers representing the amplitude of a quantized signal, into a number $y$ having a lower or higher number of binary digits following a nonlinear characteristic approximated by a series of straight line segments of varying slopes which divide the range of numbers into various groups of numbers including numbers of different amplitudes. The device comprises an input register for storing said number $x$; and an output register for storing said number $y$, means for identifying the group to which the number $x$ stored in the input register belongs, means for transferring predetermined binary digits relating to the level of the number $x$ into such output register and means for storing into such output register binary digits relating to the identification of such group.

4 Claims, 3 Drawing Figures

PULSE CODE MODULATION DIGITAL COMPANDOR

This invention relates to a compressor-expander, more commonly known as a compandor for compressing or expanding a number having $n$ binary digits into a number having a lower or higher number of binary digits.

In pulse code modulation systems (PCM), for example, a code containing a predetermined number of binary digits is used to transmit quantized values of an analog signal. As commonly known, the amplitude A of a quantized signal may only take a definite number of quantization steps the amplitude of which is hereinafter designated by character $\sigma$. In the PCM system when used for transmitting vocal signals, a ratio of 1,000 is generally accepted between the maximum and minimum amplitudes of a signal which may be transmitted. For this reason, the ratio $A/\sigma$ has been chosen to be 1,024 or $2^{10}$. Because of the positive and negative amplitudes of the analog signal, there will be 2,048 or $2^{11}$ quantization steps in quantized PCM system. However, such a value of $\sigma$ is used for weak signals only and various compression laws where $\sigma$ depends on the signal level permit to keep the quantized noise constant and acceptable by using only $2^7$ quantization steps. As it is commonly known, the quantizing noise is caused by the quantizing error resulting from the difference between the instantaneous value of the analog signal and the quantized value of the same signal which is actually transmitted.

Up until now, the compression has been produced within the coder of the PCM system and various compressors have permitted to achieve coding of a signal directly from an analog form to a nonlinear digital form having $2^7$ quantization steps. Similarly, the expanders of the prior art have permitted to pass directly from a nonlinear digital signal back into an analog signal.

It is therefore the main object of the invention to permit the compression of a digital signal which is coded linearly into a digital signal which is coded nonlinearly and vice versa.

A device for compressing or expanding a number $x$ having plural binary digits into a number $y$ having a higher or lower number of binary digits comprises:

a. an input register having a number of storage elements for storing each of the binary digits of said $x$ number;

b. an output register having a number of storage elements for storing each of the binary digits of each $y$ number;

c. a first gate circuit in each group and responsive to predetermined combinations of binary digits in the storage elements of said input register for identifying the group to which said number $x$ belongs;

d. a second gate circuit in each group interconnecting predetermined storage elements of said input and output registers and responsive to said first gate circuit for transferring predetermined binary digits relating to the amplitude of said number $x$ from said input register into said output register; and e. means responsive to said first gate circuit for storing into said output register binary digits relating to the identification of said group.

The invention will be further disclosed with reference to the accompanying drawings which illustrate a preferred embodiment of the invention and in which.

Figure 1:
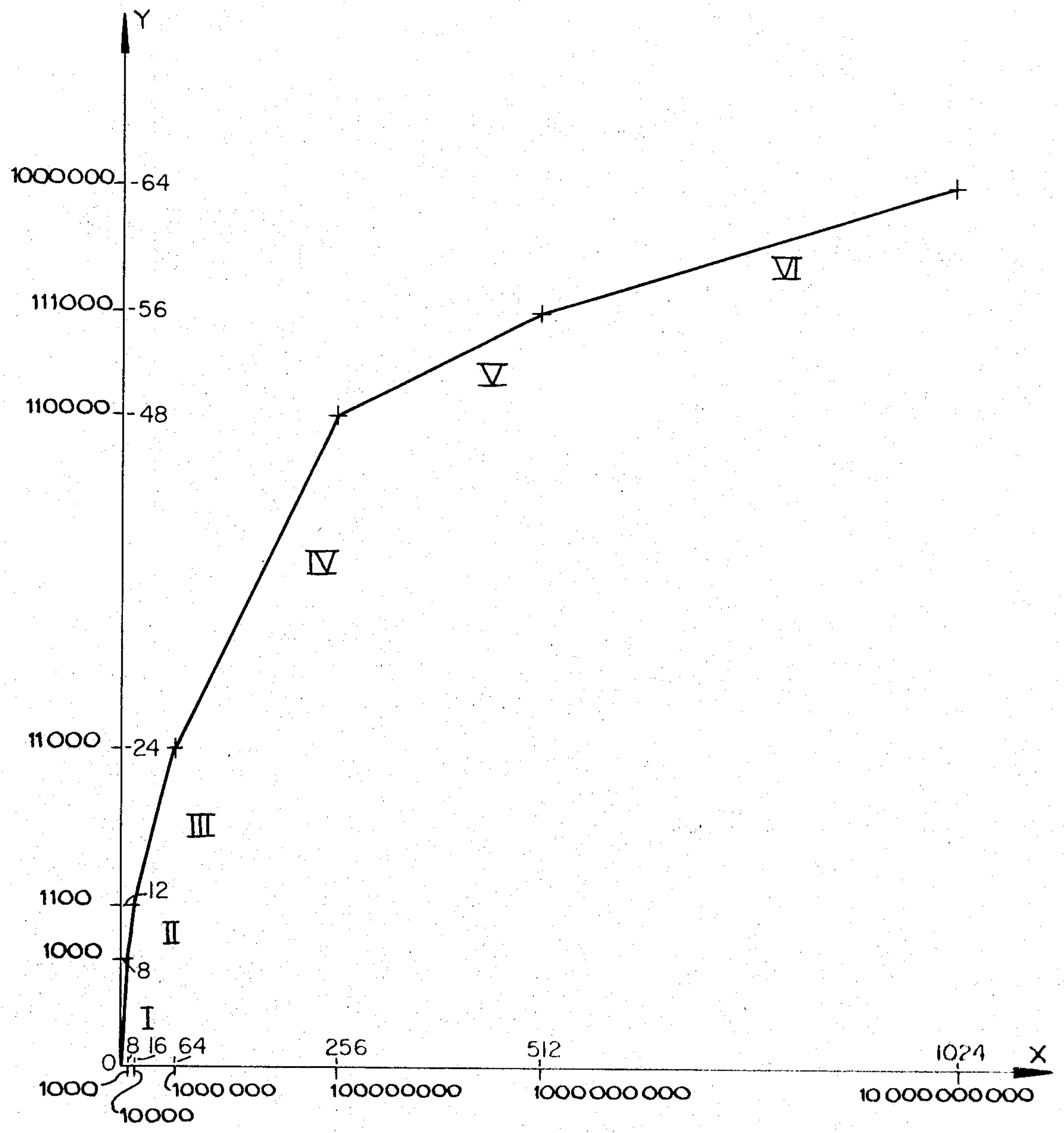
FIG. 1 illustrates a piecewise linear characteristic used for approximating the nonlinear characteristic of a compressor-expander in accordance with the invention wherein the scales are indicated by binary numbers but are nevertheless linear.

Referring to FIG. 1, the compression law which has been used in the digital compressor is as follows:

$y = ln(1+\mu x)/\ln(1+\mu)$ wherein $y$ = output signal, $x$ = input signal, and $\mu$ is a constant, for example, $\mu = 100$.

The curve obtained in following this law is approached by six straight line segments as illustrated. However, it is to be understood that any other compression law could be used.

It is possible to code the amplitude of an analog signal in two ways:

1. the level varies between 0 and +2A and the quantization steps are numbered 1 to $2^n$ using a number having $n$ binary digits;
2. the level varies between +A and −A and the quantization steps are characterized by a number having $n-1$ binary digits representing the amplitude and an extra binary digit representing the sign (+ or −) of such amplitude.

The second solution has been retained because it requires less equipment. In FIG. 1, it is only necessary to determine to which group, among six different groups (segments), the binary number belongs and what is its sign. This only requires $6 + 1 = 7$ identification circuits. On the contary, the first solution would have required to determine to which group, among 11 groups, the binary number belongs.

In the Cartesian coordinate system of FIG. 1, the binary code shown plotted below the X axis corresponds to analog values which are shown immediately above the X axis. Thus if the binary digits were converted to analog values in a conventional linear digital to analog converter, with $2^0 = 1$, the resulting analog values would form a first series of linear analog values which are plotted on the X axis. Similarly a second series of analog values would result from the conversion of the output binary digits in a linear digital to analog converter and this second series of analog values is plotted on the Y axis together with the corresponding digital code. When the first and second series are plotted on the Cartesian coordinate system the resulting series of points define a plurality of straight line segments connected together by breakpoint. These straight line segment, shown in FIG. 1, are an approximation to a logarithmic function such as defined above. In practice the maximum values of $x$ and $y$ are unity so that the values shown on the X and Y axes would be normalized to one.

It is therefore necessary to transform a number $x$ having 10 binary digits (the 11th digit being the sign)

into a number $y$ having six binary digits (the seventh digit being the sign). The coordinates of the extremities of the segments are as follows expressed in a system using binary numbers:

| | | | |
|---|---|---|---|
| $x=$ | 0 0 0 0 0 0 0 0 0 0, | $y=$ | 0 0 0 0 0 0 |
| | 1 0 0 0, | | 1 0 0 0 |
| | 1 0 0 0 0, | | 1 1 0 0 |
| | 1 0 0 0 0 0 0, | | 1 1 0 0 0 |
| | 1 0 0 0 0 0 0 0, | | 1 1 0 0 0 0 |
| | 1 0 0 0 0 0 0 0 0, | | 1 1 1 0 0 0 |
| | 1 0 0 0 0 0 0 0 0 0, | | 1 0 0 0 0 0 0 |

However, to facilitate the distinction of the groups, eight groups have been formed as illustrated in the following Table 1 by breaking the third and fourth segments into two segments each.

TABLE 1

Intervals

| Group Number | x element from | | y element from | |
|---|---|---|---|---|
| I | 0, | 111 | 0, | 111 |
| II | 1000, | 1111 | 1000, | 1011 |
| III | 10000, | 11111 | 1100, | 1111 |
| IV | 100000, | 111111 | 10000, | 10111 |
| V | 1000000, | 1111111 | 11000, | 11111 |
| VI | 10000000, | 11111111 | 100000, | 101111 |
| VII | 100000000, | 111111111 | 110000, | 110111 |
| VIII | 1000000000, | 1111111111 | 111000, | 111111 |

The equations of the eight segments expressed in binary numbers are as follows:

Equations of Segments

| Group Number | | Group Number | |
|---|---|---|---|
| I | $y=x$ | II | $y=x/10+100$ |
| III | $y=x/100+1000$ | IV | $y=x/100+1000$ |
| V | $y=x/1000+10000$ | VI | $y=x/1000+10000$ |
| VII | $y=x/100000+101000$ | VIII | $y=x/1000000+110000$ |

Referring to the above equations, it may be seen that the slopes of the various segments are: 1, 1/10, 1/100, 1/1000, 1/100,000, 1/1,000,000.

It is to be noted that the numbers in each group before and after transformation consists of one or plural group identification digits and of plural digits which indicate the level of the number in each group. For example, if the binary digits are numbered $x_9$ to $x_0$ in the order of their decreasing weights, a number $x$ in group II is composed of seven group identification digits (0000001) and of three digits indicating the level of the number in each group ($x_2$, $x_1$, $x_0$). The transformation of $x$ in this group II is $y=(x/10)+100$ which consists of four group identification digits ($y_5$ to $y_2$ : 0010) and two digits indicating the level in the group. This may be represented by the following equation:

$$x=0000001x_2x_1x_0,\ y=0010x_2x_1.$$

Using the same convention, the transformation in the eight groups will be as follows:

| | | |
|---|---|---|
| Group I | $x=0\,0\,0\,0\,0\,0\,0\,x_2\,x_1\,x_0,$ | $y=0\,0\,0\,x_2\,x_1\,x_0$ |
| II | $x=0\,0\,0\,0\,0\,0\,1\,x_2\,x_1\,x_0,$ | $y=0\,0\,1\,0\,x_2\,x_1$ |
| III | $x=0\,0\,0\,0\,0\,1\,x_3x_2\,x_1\,x_0,$ | $y=0\,0\,1\,1\,x_3\,x_2$ |
| IV | $x=0\,0\,0\,0\,1\,x_4x_3x_2\,x_1\,x_0,$ | $y=0\,1\,0\,x_4\,x_3\,x_2$ |
| V | $x=0\,0\,0\,1\,x_5x_4x_3x_2\,x_1\,x_0,$ | $y=0\,1\,1\,x_5\,x_4\,x_3$ |
| VI | $x=0\,0\,1\,x_6x_5x_4x_3x_2\,x_1\,x_0,$ | $y=1\,0\,x_6x_5\,x_4\,x_3$ |
| VII | $x=0\,1\,x_7x_6x_5x_4x_3x_2\,x_1\,x_0,$ | $y=1\,1\,0\,x_7\,x_6\,x_5$ |
| VIII | $x=1\,x_8x_7x_6x_5x_4\,x_3x_2\,x_1\,x_0,$ | $y=1\,1\,1\,x_8\,x_7\,x_6$ |

The transfer of a number in each of groups I–VIII from 10 to six binary elements is illutrated in the following Table 2 wherein the "0" have been eliminated.

TABLE 2

| Binary Element Number | Group Number I | II | III | IV | V | VI | VII | VIII |
|---|---|---|---|---|---|---|---|---|
| 1 | $x_0$ | $x_1$ | $x_2$ | $x_2$ | $x_3$ | $x_3$ | $x_5$ | $x_6$ |
| 2 | $x_1$ | $x_2$ | $x_3$ | $x_3$ | $x_4$ | $x_4$ | $x_6$ | $x_7$ |
| 3 | $x_2$ | | $x_4=1$ | $x_4$ | $x_5$ | $x_5$ | $x_7$ | $x_8$ |
| 4 | | 1 | 1 | | $x_6=1$ | $x_6$ | | 1 |
| 5 | | | | 1 | 1 | | 1 | 1 |
| 6 | | | | | | 1 | 1 | 1 |

Table 2 mentioned above suggest a method for effecting the transformation. It will be necessary to:

1. identify the group to which $x$ belongs (for example, $0000001x_2x_1x_0$ is a number in group II);
2. transfer the useful 2, 3 or 4 $x_i$ in a register having six positions;
3. store in the register the group identification digits.

The above-mentioned operations 2 and 3 may be effected simultaneously. If the six position register is empty before transferring any numbers into it, Table 2 indicates the elements to be placed in it.

The identification logic functions of each of the groups are:

| | |
|---|---|
| I | $G_1=\bar{x}_9\bar{x}_8\bar{x}_7\bar{x}_6\bar{x}_5\bar{x}_4\bar{x}_3$ |
| II | $G_2=\bar{x}_9\bar{x}_8\bar{x}_7\bar{x}_6\bar{x}_5\bar{x}_4x_3$ |
| III | $G_3=\bar{x}_9\bar{x}_8\bar{x}_7\bar{x}_6\bar{x}_5x_4$ |
| IV | $G_4=\bar{x}_9\bar{x}_8\bar{x}_7\bar{x}_6x_5$ |
| V | $G_5=\bar{x}_9\bar{x}_8\bar{x}_7x_6$ |
| VI | $G_6=\bar{x}_9\bar{x}_8x_7$ |
| VII | $G_7=\bar{x}_9x_8$ |
| VIII | $G_8=x_9$ |

Figure 2:
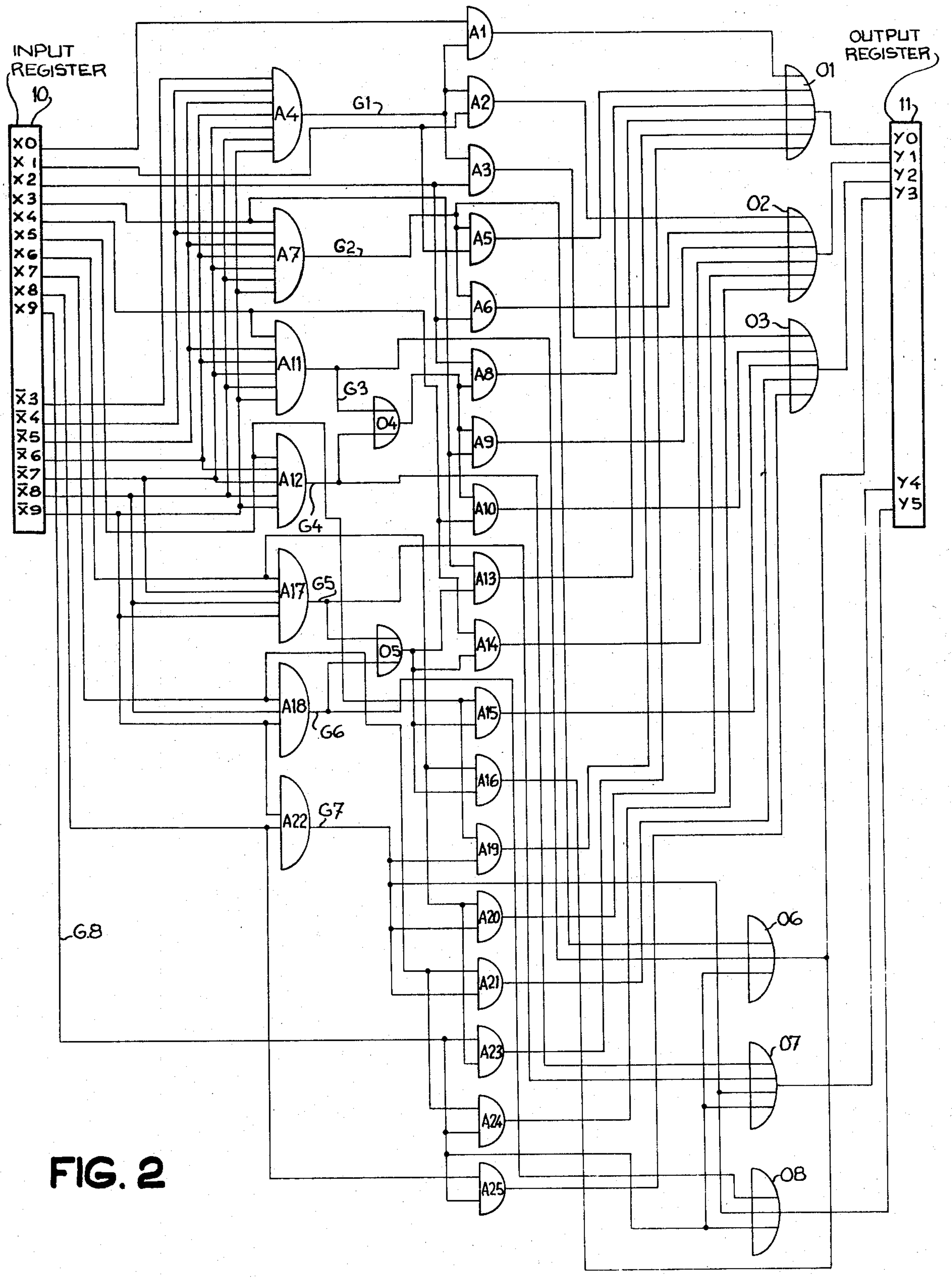
FIG. 2 illustrates the circuit diagram of a compressor.

FIG. 2 illustrates an electrical diagram of the transfer circuits required for all the groups of numbers to effectuate the transformation of Table 2. Such transfer circuits include AND gates $A_1$ to $A_{25}$ and OR gates $0_1$ to $0_8$.

Taking the groups separately in consecutive order, it will be seen that a number in group I the identification digits $x_9\,x_8\,x_7\,x_6\,x_5\,x_4\,x_3$ of which are equal to 0 0 0 0 0 0 0 will permit gate $A_4$ to conduct to provide a digital output "1" to the first input of gates $A_1$, $A_2$, and $A_3$ to permit such gates to transfer binary digits $x_0$, $x_1$ and $x_2$ stored in the input register 10 of the compressor into the proper storage elements $y_0$, $y_1$ and $y_2$ of the output register 11 of the compressor through OR gates $0_1$ to $0_3$ in accordance with the above-mentioned Table 2.

The group identification digits of a number in group II having the form 0 0 0 0 0 0 1 will render gate $A_7$ conductive and thereby apply a digital signal "1" to the first input of gates $A_5$ and $A_6$, thus causing the transfer of binary digits $x_1$ and $x_2$ from the input register of the compressor into the proper storage elements $y_0$ and $y_1$ of the output register through the second input of OR gates $0_1$ and $0_2$.

A number in group III having the following identification digits 0 0 0 0 0 1 will render gate $A_{11}$ conductive and apply a digital signal "1" to the first input of gates $A_8$, $A_9$ and $A_{10}$ through OR gate $0_4$, thus causing the transfer of digit $x_2$, $x_3$ and $x_4$ of the input register of the compressor into the proper storage elements $y_0$, $y_1$ and $y_2$ of the output register thereof through the OR gates $0_1$ to $0_3$.

A number in group IV having the following identification digits 0 0 0 0 1 will render gate $A_{12}$ conductive and thus apply a digital input "1" to gates $A_8$, $A_9$ and $A_{10}$, thus causing the transfer of digits $x_2$, $x_3$ and $x_4$ in the input register of the compressor into the storage elements $y_0$, $y_1$ and $y_2$ of the output register. It will be noted that the identification digits of groups III and IV are both applied through OR gate $0_4$ to the same transfer gates $A_8$, $A_9$ and $A_{10}$. Indeed, $x_2$, $x_3$ and $x_4$ must be transferred into storage elements $y_0$, $y_1$ and $y_2$ in both groups, the only difference being that $x_4 = 1$ in group III.

A number in group V having the following identification digits 0 0 0 1 will render gate $A_{17}$ conductive and thus apply a digital signal "1" to the first input of gates $A_{13}$ to $A_{16}$ through OR gate $0_5$, thus transferring digits $x_3$, $x_4$, $x_5$ and $x_6$ in the input register of the compressor into the storage elements $y_0$, $y_1$, $y_2$ and $y_3$ of the output register of the compressor. The output of AND gates $A_{13}$, $A_{14}$ and $A_{15}$ is applied to the register through OR gates $0_1$, $0_2$ and $0_3$ respectively.

A number in group VI having the identification digits 0 0 1 will render gate $A_{18}$ conductive thus transferring digits $x_3$, $x_4$, $x_5$ and $x_6$ into storage elements $y_0$, $y_1$, $y_2$ and $y_3$. It will be noted that the output of gates $A_{17}$ and $A_{18}$ are both applied through OR gate $0_5$ to gates $A_{13}$ to $A_{16}$. This is because the same digits $x_3$, $x_4$, $x_5$ and $x_6$ are to be transferred into storage elements $y_0$, $y_1$, $y_2$ and $y_3$ in both groups V and VI except that in group V, $x_6 = 1$.

An element in group VII having the following identification digits 0 1 will render gate $A_{22}$ conductive thus applying a digital signal "1" to gates $A_{19}$, $A_{20}$ and $A_{21}$ and transferring digits $x_5$, $x_6$ and $x_7$ into the storage elements $y_0$, $y_1$ and $y_2$ through the OR gates $0_1$ to $0_3$.

A number in group VIII having the identification digit 1 will apply a digital signal 37 1" to gates $A_{23}$, $A_{24}$ and $A_{25}$ thus transferring digits $x_6$, $x_7$ and $x_8$ into the storage elements $y_0$, $y_1$ and $y_2$.

FIG. 2 also illustrates the storage of the identification digits for each of the groups I to VIII. There is shown an OR gate $0_6$ to which is applied the signals $G_2$, $G_3$ and $G_8$, an OR gate $0_7$, to which is applied the identification signals $G_4$, $G_5$, $G_7$ and $G_8$, and OR gate $0_8$ to which is applied the identification signals $G_6$, $G_7$ and $G_8$, such identification signals being also illustrated in FIG. 2. One of the identification signals $G_1$ to $G_8$ becomes equal to 1 when a number pertaining to a predetermined group occurs while the remaining identification signals remain equal to zero. For example, a number in group I causes $G_1$ alone to be equal to 1 and, consequently, digits $y_3$, $y_4$ and $y_5$ in the storage elements of the output register remain equal to zero.

A number in group II causes a digit 1 to be applied to OR gate $0_6$ to change the state of $y_3$ into the state 1 while $y_2$, $y_4$ and $y_5$ remain in the state zero.

A number in group III causes a digit $y_3 = 1$ to be stored in the output register while $y_4$ and $y_5$ remain equal to zero. In addition, a digit 1 is stored in storage element $y_2$.

A number in group IV causes a digit 1 to be applied to OR gate $0_7$ to change the state of $y_4$ into the state 1 while $y_3$ and $y_5$ remain equal to zero.

A number in group V causes a digit 1 to be applied to OR gate $0_7$ to change the state of $y_4$ into state 1 while $y_5$ remains equal to 0. In addition, a digit 1 is stored into storage element $y_3$.

An element in group VI causes a signal 1 to be applied to OR gate $0_8$ to change the state of $y_5$ into state 1 while $y_4$ remains equal to zero.

An element in group VII causes a digit 1 to be applied to both OR gates $0_7$ and $0_8$ thus changing the states of $y_4$ and $y_5$ into state 1 while $y_3$ remains equal to zero.

An element in group VIII causes a digit 1 to be applied to OR gates $0_6$, $0_7$ and $0_8$ to change the state of $y_3$, $y_4$ and $y_5$ into state 1.

The purpose of the digital expander is to transform a signal having seven binary elements back into a signal having 11 binary elements in which $\sigma$ is constant for all amplitudes of the signal. The compression law is opposite to that of the compressor, that is if $y$ is the input number having six binary elements, $x$, the output number, will have 10 binary elements. The equations are as follows:

| | | | |
|---|---|---|---|
| Group | I | $y = 0\,0\,0\,y_2\,y_1\,y_0$ | $x = 0\,0\,0\,0\,0\,0\,0\,y_2\,y_1\,y_0$ |
| | II | $y = 0\,0\,1\,0\,y_1\,y_0$ | $x = 0\,0\,0\,0\,0\,0\,1\,y_1\,y_0\,0$ |
| | III | $y = 0\,0\,1\,1\,y_1\,y_0$ | $x = 0\,0\,0\,0\,0\,1\,y_1 y_0\,0\,0$ |
| | IV | $y = 0\,1\,0\,y_2\,y_1\,y_0$ | $x = 0\,0\,0\,0\,1\,y_2 y_1 y_0\,0\,0$ |
| | V | $y = 0\,1\,1\,y_2\,y_1\,y_0$ | $x = 0\,0\,0\,1\,y_2 y_1 y_0\,0\,0\,0$ |
| | VI | $y = 1\,0\,y_3 y_2\,y_1\,y_0$ | $x = 0\,0\,1\,y_3 y_2 y_1 y_0\,0\,0\,0$ |
| | VII | $y = 1\,1\,1\,y_2\,y_1\,y_0$ | $x = 0\,1\,y_2 y_1 y_0\,0\,0\,0\,0\,0$ |
| | VIII | $y = 1\,1\,1\,y_2\,y_1\,y$ | $x = 1\,y_2 y_1 y_0\,0\,0\,0\,0\,0\,0$ |

The transformation method is the same as for the compressor. If the ten position register is empty before the transfer, the following Table 3 indicates the elements to be placed into it.

TABLE 3

| Binary element number | Group Number I | II | III | IV | V | VI | VII | VIII |
|---|---|---|---|---|---|---|---|---|
| 1 | $y_0$ | | | | | | | |
| 2 | $y_1$ | $y_0$ | | | | | | |
| 3 | $y_2$ | $y_1$ | $y_0$ | $y_0$ | | | | |
| 4 | | 1 | $y_1$ | $y_1$ | $y_0$ | $y_1$ | | |
| 5 | | | $y_2$="1" | $y_2$ | $y_1$ | $y_1$ | | |
| 6 | | | | 1 | $y_2$ | $y_2$ | $y_0$ | |
| 7 | | | | | $y_3$="1" | $y_3$ | $y_1$ | $y_0$ |
| 8 | | | | | | 1 | $y_2$ | $y_1$ |
| 9 | | | | | | | 1 | $y_2$ |
| 10 | | | | | | | | 1 |

The identification logic functions of each of the groups are:

| | |
|---|---|
| I | $C_1 = \overline{y_5}\,\overline{y_4}\,\overline{y_3}$ |
| II | $C_2 = \overline{y_5}\,\overline{y_4}\,y_3\,\overline{y_2}$ |
| III | $C_3 = \overline{y_5}\,\overline{y_4}\,y_3\,y_2$ |
| IV | $C_4 = \overline{y_5}\,y_4\,\overline{y_3}$ |
| V | $C_5 = \overline{y_5}\,y_4\,y_3$ |
| VI | $C_6 = y_5\,\overline{y_4}$ |
| VII | $C_7 = y_5\,y_4\,\overline{y_3}$ |
| VIII | $C_8 = y_5\,y_4\,y_3$ |

Figure 3:
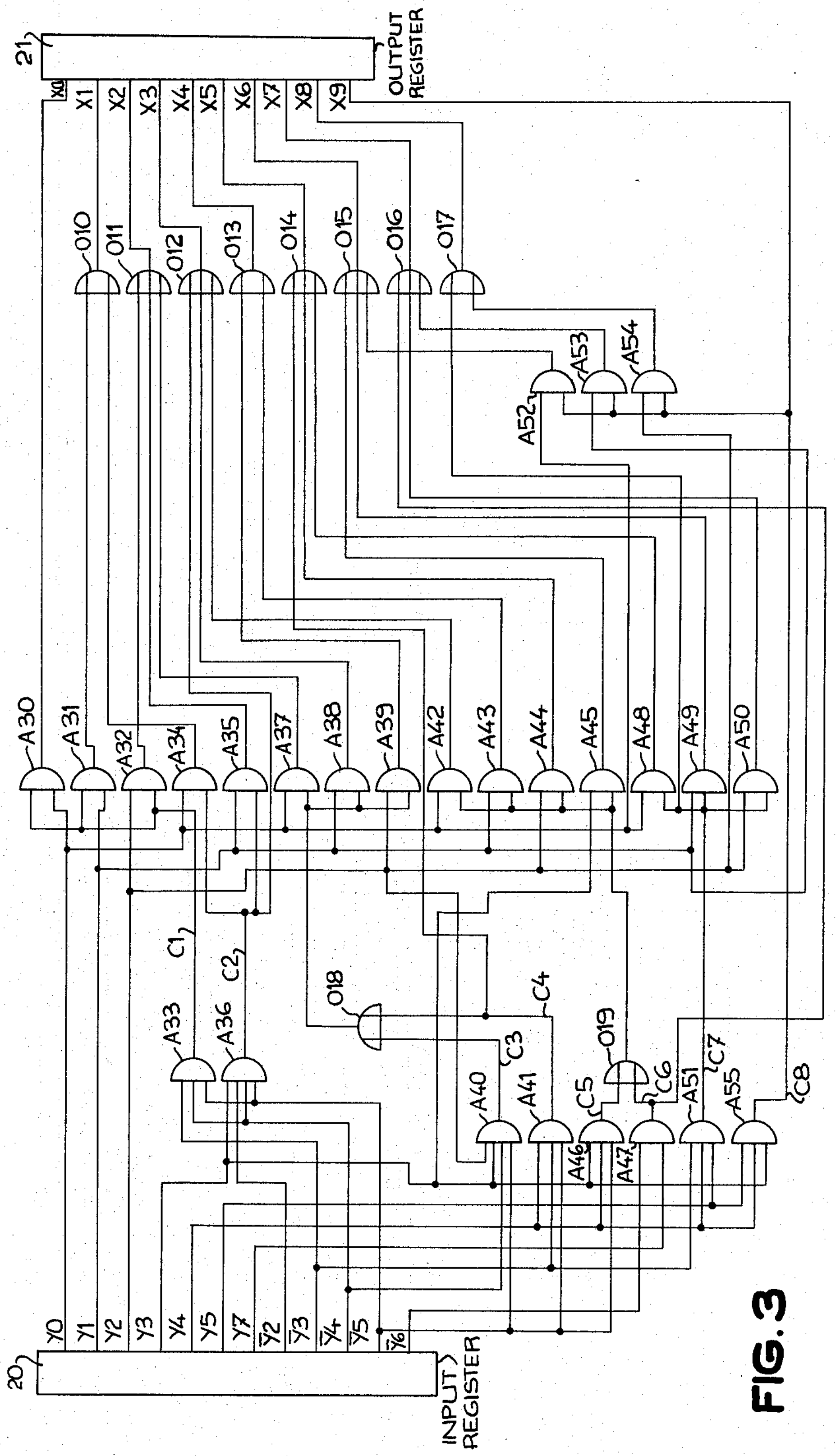
FIG. 3 illustrates the circuit diagram of an expander for performing the reverse operation of the compressor.

FIG. 3 illustrates the transfer circuits of the expander including AND gates $A_{30}$ to $A_{55}$ and OR gates $0_{10}$ to $0_{19}$.

A number in Group I the identification digits $y_5\,y_4\,y_3$ of which are 0 0 0 will render gate $A_{33}$ conductive and apply a digital signal 1 to AND gates $A_{30}$, $A_{31}$ and $A_{32}$ thus transferring digits $y_0$, $y_1$ and $y_2$ of the input register 20 of the expander into the storage elements $x_0$, $x_1$ and $x_2$ of the output register 21 of the expander. The output of AND gates $A_{31}$ and $A_{32}$ is applied to the first input of OR gates $0_{10}$ and $0_{11}$ respectively.

An element in group II the identification digits $y_5$ $y_4$ $y_3$ $y_2$ of which are 0 0 1 0 will render gate $A_{36}$ conductive thus applying a digital signal 1 to gates $A_{34}$ and $A_{35}$ to transfer digits $y_0$ and $y_1$ into storage elements $x_1$ and $x_2$ through the second input of gates $0_{10}$ and $0_{11}$.

A number in group III the identification digits $y_5$ $y_4$ $y_3$ $y_2$ of which are 0 0 1 1 will render gate $A_{40}$ conductive thus applying a digital signal 1 to gates $A_{37}$, $A_{38}$ and $A_{39}$ through OR gate $0_{18}$ to transfer digits $y_0$, $y_1$ and $y_2$ into storage elements $x_2$, $x_3$ and $x_4$. The output of AND gates $A_{37}$ to $A_{39}$ is applied to the output register 21 through the appropriate inputs of OR gates $0_{11}$ to $0_{13}$.

An element in group IV the identification digits of which are 0 1 0 will render gate $A_{41}$ conductive thus applying a digital signal 1 to gates $A_{37}$, $A_{38}$ and $A_{39}$ and transferring digits $y_0$, $y_1$ and $y_2$ into storage elements $x_2$, $x_3$ and $x_4$. It is to be noted that the identification of both groups III and IV is performed by the same transfer circuit through OR gate $0_{18}$. It is because the same digits $y_0$, $y_1$ and $y_2$ are transferred in both groups except that for group III, $y_2=1$.

A number in group V having identification digits 0 1 1 will render gate $A_{46}$ conductive thus applying a digital signal 1 to gates $A_{42}$ to $A_{45}$ through OR gate $0_{19}$ to transfer digits $y_0$, $y_1$, $y_2$ and $y_3$ into storage elements $x_3$, $x_4$, $x_5$ and $x_6$ through OR gates $0_{12}$ to $0_{15}$ respectively.

An element in group VI having identification digits 10 will render gate $A_{47}$ conductive thus applying a digital signal 1 to gates $A_{42}$ to $A_{45}$ and transferring digits $y_0$, $y_1$, $y_2$ and $y_3$ into storage elements $x_3$, $x_4$, $x_5$ and $x_6$. It is to be noted that groups V and VI use the same transfer circuit because in both groups the same digits $y_0$, $y_1$, $y_2$ and $y_3$ are to be transferred into $x_3$, $x_4$, $x_5$ and $x_6$ except that $y_3=1$ in group V.

An element in group VII having identification digits 1 1 0 will render gate $A_{51}$ conductive thus applying a digital signal 1 to gates $A_{48}$ to $A_{50}$ and transferring digits $y_0$, $y_1$ and $y_2$ into storage elements $x_5$, $x_6$ and $x_7$ through the appropriate inputs of OR gates $0_{14}$ to $0_{16}$.

An element in group VIII having identification digits 1 1 1 will render gate $A_{55}$ conductive thus applying a digital signal 1 to gates $A_{52}$ to $A_{54}$ and transferring digits $y_0$, $y_1$ and $y_2$ into storage elements $x_6$, $x_7$ and $x_8$ through the appropriate inputs of OR gates $0_{15}$ to $0_{17}$.

The storage of the group identification digits is as follows:

a. a number in group I leaves storage elements $x_3$ to $x_9$ unchanged and thus equal to zero;
b. a number in group II stores a digit 1 in storage element $x_3$ while $x_4$ to $x_9$ remain equal to zero;
c. a number in group III stores a digit 1 in storage element $x_4$ while leaving storage elements $x_5$ to $x_9$ equal to zero;
d. a number in group IV stores a digit 1 in storage element $x_5$, while leaving storage elements $x_6$ to $x_9$ unchanged;
e. a number in group V stores a digit 1 in storage element $x_6$ while leaving storage elements $x_7$ to $x_9$ unchanged;
f. a number in group VI will store a digit 1 in storage element $x_7$ while leaving storage elements $x_8$ and $x_9$ unchanged;
g. a number in group VII will store a digit 1 in $x_8$ while leaving $x_9$ unchanged;
h. a number in group VIII will store a digit 1 in storage element $x_9$.

Although the above described compressor-expander has been disclosed for use with a PCM system using a seven digit code, it is to be understood that it could be used in any system requiring compression or expansion of a binary number having any number of digits into a second number having a lower or higher number of digits.

We claim:

1. A device for parallel conversion of m digit coded signals to n digit coded signals, $m \neq n$, wherein the m digit coded signals are such that when converted to analog in a linear digital to analog converter produce a first series of analog output values and the n digit coded signals are such that when converted to analog in a linear digital to analog converter produce a second series of analog output values and wherein a plot of said 1st series on the X axis and the 2nd series on the Y axis of a Cartesian coordinate system, produces a locus of points defining a plurality of successive straight line segments each having a different slope and connected to one another at breakpoints, said line segments extending from different lower absolute analog values to different higher absolute analog values and approximating a logarithmic function of $x$ substantially described by $$f(x)=Y=\ln(1+Cx)/\ln(1+C)$$

where $C$ is a constant, wherein more significant digits of said coded signals correspond to analog values associated with and identifying said breakpoints and less significant digits of said coded signals correspond to analog values associated with the position on said line segment which has the identified breakpoint corresponding to its lowest absolute analog values, comprising;

1. an input register having a plurality of storage elements for storing the $m$ digit coded signal,
2. an output register having a plurality of storage elements for storing the $n$ digit coded signal,
3. a plurality of first gate circuit means equal at least to the number of straight line segments for connecting predetermined input storage elements to predetermined output storage elements, said plurality of first gate circuit means being responsive to the most significant activated digit of the $m$ digit coded signal for identifying the breakpoint of said line segments, and
4. a plurality of second gate circuit means each responsive to one of said first gate circuit means and to digits less significant than the said significant digit of the $m$ digit coded signal for connecting predetermined input storage elements to predetermined output storage elements for identifying the position along the straight line segment having the identified breakpoint which breakpoint corresponds to the lowest equivalent absolute analog values of the particular segment.

2. A device as recited in claim 1 wherein line segment breakpoints are identified by the logic functions:

$f(1)=\overline{X}_{m-1}\,\overline{X}_{m-2}\,\overline{X}_{m-3}\cdots\overline{X}_{m-k}$ $f(2)=\overline{X}_{m-1}\,\overline{X}_{m-2}\,\overline{X}_{m-3}\cdots\overline{X}_{m-k-1}\,X_{m-k}$ $f(3)=\overline{X}_{m-1}\,\overline{X}_{m-2}\,\overline{X}_{m-3}\cdots\overline{X}_{m-k-2}\,X_{m-k-1}$ $f(P-1)=\overline{X}_{m-1}\,X_{m-2}$ $f(P)=X_{m-1}$ where $\overline{X}$ represents the opposite binary state as X; $m-k-1$ is an integer greater than zero; $k-1$ is a positive integer less than $m$; and $P$ is a positive integer greater than one.

3. A device as recited in claim 1 wherein line segment breakpoints are identified by the logic functions:

$f(1)=\overline{X}_9\overline{X}_8\overline{X}_7\overline{X}_6\overline{X}_5\overline{X}_4\overline{X}_3$ $f(2)=\overline{X}_9\overline{X}_8\overline{X}_7\overline{X}_6\overline{X}_5\overline{X}_4X_3$ $f(3)=\overline{X}_9\overline{X}_8\overline{X}_7\overline{X}_6\overline{X}_5X_4$ $f(4)=\overline{X}_9\overline{X}_8\overline{X}_7\overline{X}_6X_5$ $f(5)=\overline{X}_9\overline{X}_8\overline{X}_7X_6$ $f(6)=\overline{X}_9\overline{X}_8X_7$ $f(7)=\overline{X}_9X_8$ $f(8)=X_9$ wherein $\overline{X}$ represents the opposite binary state as X.

4. A device as recited in claim 1 wherein line segment breakpoints are identified by the logic functions:

$f(1)=\overline{Y}_5\overline{Y}_4\overline{Y}_3$ $f(2)=\overline{Y}_5\overline{Y}_4Y_3\overline{Y}_2$ $f(3)=\overline{Y}_5\overline{Y}_4Y_3Y_2$ $f(4)=\overline{Y}_5Y_4\overline{Y}_3$ $f(5)=\overline{Y}_5Y_4Y_3$ $f(6)=Y_5\overline{Y}_4$ $f(7)=Y_5Y_4\overline{Y}_3$ $f(8)=Y_5Y_4Y_3$ wherein $\overline{Y}$ represents the opposite binary state as Y.

* * * * *